United States Patent

Sawada et al.

[11] Patent Number: 5,265,716
[45] Date of Patent: Nov. 30, 1993

[54] SWITCH WITH MULTIPLE LEVERS AND MULTIPLE SWITCH ASSEMBLY USING SAME

[75] Inventors: Kenji Sawada; Satoshi Terashita, both of Furukawa; Hiroaki Takahashi, Miyagi, all of Japan

[73] Assignee: Alps Electric Co., Ltd., Tokyo, Japan

[21] Appl. No.: 878,129

[22] Filed: May 4, 1992

[30] Foreign Application Priority Data

| May 10, 1991 | [JP] | Japan | 3-041790[U] |
| May 10, 1991 | [JP] | Japan | 3-041791[U] |
| Nov. 21, 1991 | [JP] | Japan | 3-103441[U] |

[51] Int. Cl.⁵ ............................................. H01H 9/20
[52] U.S. Cl. ............................... 200/5 R; 200/5 E; 200/50 C
[58] Field of Search ............. 200/1 V, 5 R, 5 B, 5 E, 200/6 R, 50 C, 18

[56] References Cited

U.S. PATENT DOCUMENTS

| 3,617,661 | 11/1971 | Nome | 200/5 R |
| 4,654,487 | 3/1987 | Sawada | 200/1 V |
| 4,678,872 | 7/1987 | Gutman | 200/5 R |
| 4,689,450 | 8/1987 | Sawada | 200/6 R |
| 4,700,586 | 10/1987 | Miura | 74/483 PB |
| 4,743,714 | 5/1988 | Chien | 200/5 E |
| 5,021,614 | 6/1991 | Sasaki et al. | 200/5 R |
| 5,130,501 | 7/1992 | Maeda | 200/50 C |

Primary Examiner—J. R. Scott
Attorney, Agent, or Firm—Guy W. Shoup; Patrick T. Bever

[57] ABSTRACT

A seesaw type switch including a switch housing, a first lever pivotably connected to the switch housing about an axis, and a second lever pivotably connected to the switch housing about the axis. The first lever is pivoted independent of the second lever to press a movable contact against a fixed contact, and similarly the second lever is pivoted independent of the first lever to press a movable contact against a fixed contact. Also disclosed is a switch apparatus incorporating three seesaw type switches and includes a pair of interlocking members which are used to actuate two of the switches simultaneously.

3 Claims, 11 Drawing Sheets

SWITCH WITH MULTIPLE LEVERS AND MULTIPLE SWITCH ASSEMBLY USING SAME

BACKGROUND OF THE INVENTION

1. Field of the Invention

This invention relates to a switch apparatus, and is particularly concerned with a switch apparatus for adjusting an automobile seat position.

2. Description of the Prior Art

Seesaw type switches are capable of conducting large currents, and are therefore often extensively used to for controlling the connection of a power source to an electric motor, such as an automobile seat positioning motor.

FIGS. 10 to 12(b) show a prior art seesaw switch. As shown in FIG. 10, the prior art seesaw switch includes a switch housing 1 which includes first and second parallel box sections 1b and 1c. Each box section 1b and 1c includes a bottom surface and an open top. Side plates 1a (only one shown) are formed on outer parallel walls of the box sections 1b and 1c. A lever 5 is pivotably mounted to the side plates 1a using a shaft 2.

As shown in FIG. 11, the lever 5 has a forked shape and includes a first protrusion 5c extending into the first box section 1b and a second protrusion 5d extending into the second box section 1c. A knob 3 is connected to an upper portion of the lever 5 to facilitate manual actuation of the seesaw switch. A pair of fitting holes 5a and 5b are formed in a lower surface of the protrusions 5c and 5d, respectively. Driving rods 7a, 7b are slidably housed in the fitting holes 5a and 5b, respectively, and are biased away from the lever 5 by springs 6a, 6b, respectively.

In addition, first and second fixed contacts 10a and 10b are fixedly connected to the bottom surface at opposite ends of the first box section 1b, and third and fourth fixed contacts 11a and 11b are connected to the bottom surface at opposite ends of the second box section 1c. A first pivot plate 12a is fixedly connected to the bottom surface of the first box section 1b at a position substantially midway between the fixed contacts 10a and 10b, and a second pivot plate 12b is fixedly connected to the bottom surface of the second box section 1c at a position substantially midway between the fixed contacts 11a and 11b. In addition, moving contact pieces 8a and 8b, which are formed by bending an elongated metallic plate, are pivotably supported on the pivot plates 12a and 12b, respectively.

As shown in FIG. 12(a), when the prior art seesaw switch is in a neutral (unactuated) position, the driving rods 7a and 7b bias the moving contact pieces 8a and 8b against the pivot plates 12a and 12b, respectively. Note that the pivot plate 12a is positioned relative to the driving rod 7a such that, in the neutral position, the moving piece 8a pivots about the pivot plate 12a such that a first end of the moving contact piece 8a is held in contact with the fixed contact 10a, and a second end of the moving contact piece is separated from the fixed contact 10b. Likewise, the pivot plate 12b is positioned relative to the driving rod 7b such that, in the neutral position, the moving piece 8b pivots about the pivot plate 12b such that a first end of the moving contact piece 8b is held in contact with the fixed contact 11b, and a second end of the moving contact piece 8b is separated from the fixed contact 11a.

As shown in FIG. 12(b), when a first end 3a of the knob 3 is pressed downward, the lever 5 is pivoted counterclockwise, and the driving rod 7a slides in a first direction on the moving contact piece 8a toward the fixed contact 10a. When the driving rod 7a passes over the pivot plate 12a, the moving contact piece 8a pivots clockwise around the support plate 12a, thereby causing the second end of the moving contact piece 8a to contact the fixed contact 10b, and lifting the first end of the movable contact piece 8a away from the fixed contact 10a. Note that, although the driving rod 7b slides on the second moving contact 8b in the first direction, the second moving contact 8b remains pivoted such that the first end contacts the fixed contact 11b because the driving rod 7b does not pass over the pivot plate 12b. In this position, a first switching operation is carried out. When released, the driving rod 7b biases the lever 5 back into the neutral position.

In a similar manner, when a second end 3b of the knob 3 is pressed downward from the neutral position, the lever 5 is pivoted clockwise, and the driving rods 7a and 7b slide on the moving contact pieces 8a and 8b toward the fixed contacts 10b and 11b. When this occurs, the first moving contact piece 8a remains in contact with the fixed contact 10a, and the second moving contact pivots about the pivot plate 12b to contact the fixed contact 11b, thus effecting a second switching operation.

FIGS. 13 to 15 illustrate a prior art switch apparatus for adjusting automobile seat positions which comprises multiple seesaw switches, as described above. The switch apparatus includes a housing 17 in which are located a seesaw switch A for adjusting longitudinal seat positions, a seesaw switch B for adjusting seat front heights and a seesaw switch C for adjusting seat rear heights. A slide plate 19 is slidably mounted in the housing 17, and a knob 18 is connected to the slide plate 19. As shown in FIG. 13, the slide 19 defines a first groove 19a opposite to a position of the lever 5(A) of the seesaw switch A, a second groove 19b opposite to a position of the lever 5(B) of the lever switch B and a third groove 19c opposite to the lever 5(C) of the lever switch C, each being provided with a small amount of play.

As shown in FIG. 15, when the knob 18 is manually actuated such that the slide plate 19 moves in the direction X1, a side of the groove 19a engages the lever 5(A), thereby causing the lever 5 to rotate in the seesaw switch A in the direction of the arrow Θ (clockwise) into a first operating position in which a seat is moved, for example, forward by a motor and a power transmission system (not shown). Similarly, when the knob is manually actuated in the direction of the arrow X2, the lever 5(A) engages with the first groove 19a and is turned in the counterclockwise direction, thereby causing, for example, the seat to move backward. If the knob 18 is released from either of the first or second operating positions, the lever 5 returns to a neutral position and the seat remains at a desired position. In addition, as shown in FIG. 14, when a first end of the knob 18 is moved to the left, a side of the groove 19c of the slide plate 19 causes the lever 5(C) to pivot counterclockwise into a third operating position in which, for example, a front of the seat ascends. Similarly, when the first end of the knob 18 is moved to the right, a side of the groove 19a causes the lever 5(C) to pivot clockwise into a fourth operating position in which, for example, the front of the seat descends. In a similar manner, the switch B is moved into fifth and sixth operating position in which, for example, a back of the seat is raised and lowered, by moving a second end of the knob to the right or to the left.

The above-described prior art switch of FIGS. 10-12 includes a single lever 5, each of which is actuated by manually pivoting a single knob 3. Consequently, if one end 3a of the knob 3 is pressed, then the other end 3b protrudes upward; therefore, the switch must be provided with an enough space to allow for the protruding end, thereby effecting the placement of other parts located next to the switch. This may bring about a big layout problem of the parts in situations in which the switch is used as a change-over switch for seat adjusting, for example, in automobiles where space is limited.

Further, when the switch is used in the switch apparatus of FIGS. 13-15 as a seat adjusting switch, since other switches arranged in a car are typically push-button types, the manipulation of the knob 18 is incompatible, thereby eliminating a sense of congruence. Still further, it is generally demanded that a push-button type switch apparatus operating on a large current be easily manufactured, as compared to the prior art switch apparatus.

SUMMARY OF THE INVENTION

The switch and switch assembly in accordance with the present invention addresses the shortcomings of the aforementioned prior art switch apparatus, and an object of the present invention is to provide a switch assembly which conducts a large current, which is compatible with a push-button operating system, and which is compact and easy to manufacture.

In accordance with a first embodiment of the present invention, a switch includes a switch housing, a first lever pivotably connected to the switch housing about an axis, the first lever including a first driving portion contacting a first middle portion of a first movable contact, and a second lever pivotably connected to the switch housing about the axis, the second lever including a second driving portion contacting a second middle portion of a second movable contact. When the first lever is manually actuated from a neutral position into a first pivoted position, the first lever biases the first movable contact into a first operating position, and the second lever remains in the neutral position. Because the second lever is not raised when the first lever is actuated, the seesaw switch can be actuated using a pair of push buttons. Likewise, when the second lever is manually actuated from the neutral position into a second pivoted position, the second lever biases the second movable contact into a second operating position while the first lever remains in the neutral position.

In accordance with a second embodiment of the present invention, the first lever includes a first stopper portion positioned such that when the first lever is in the first pivoted position, the first stopper portion prevents the second lever from pivoting into the second pivoted position, and the second lever includes a second stopper portion positioned such that when the second lever is in the second pivoted position, the second stopper portion prevents the first lever from pivoting into the first pivoted position. The seesaw switch of the second embodiment prevents the switch from being pressed into both the first and second operating positions simultaneously, thereby preventing damage to an electrical component, such as a motor.

In accordance with a third embodiment of the present invention, a multiple switch apparatus includes first, second and third seesaw switches aligned in a case. Each of the seesaw switches is made in accordance with the first embodiment. Two pivoting knobs are pivotably connected to the case over the first and second switches, and four push buttons are located on the case between the two pivoting knobs and over the third switch. Two of the push buttons are connected to actuate the levers of the third switch, and two of the push button switches are connected to actuate elongated members. Each of the elongated members is pivotably mounted in the case and actuates one lever on each of the first and second switch. With this apparatus, because the elongated members actuate both the first and second switches simultaneously, the number of functions performed using three seesaw switches is increased.

DETAILED DESCRIPTION OF PREFERRED EMBODIMENTS

A first embodiment of this invention will be described with reference to FIGS. 1 through 3.

Figure 1:
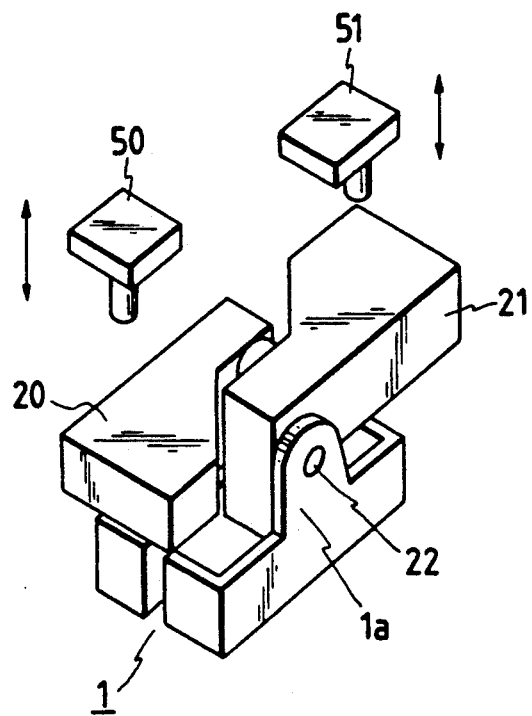
FIG. 1 is a perspective view of a first embodiment of the present invention.

As shown in FIG. 1, a seesaw switch in accordance with the first embodiment of the present invention includes a switch housing 1. A first a lever 20 and a second lever 21 are independently rotatably mounted to the switch housing 1 around an axle (axis) 22. Further, knobs 50 and 51 are mounted to a case (not shown) over the end portions of the levers 20, 21, respectively, each knob being pushed against the levers 20, 21.

Figure 2:
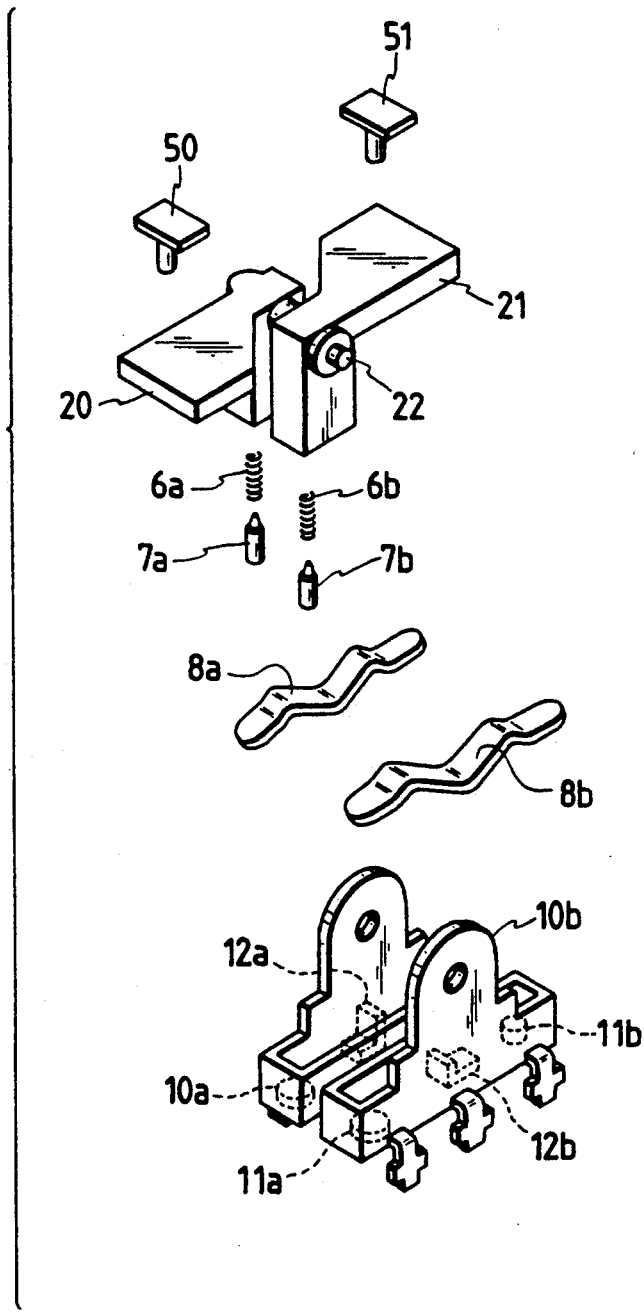
FIG. 2 is an exploded perspective view of a principal part of the first embodiment of the present invention.

As shown in FIG. 2, similar to the prior art seesaw switch, discussed above, a first driving rod (portion) 7a is retractably enclosed in the lever 20 and is biased away from the lever 20 by a spring 6a, and a second driving rod 7b retractably enclosed in the lever 21 and is biased by a spring 6b. Further, first and third fixed contacts 10a, 10b and second and fourth fixed contacts 11a, 11b are fixedly mounted to a bottom surface of the switch housing 1 such that the first and second fixed contacts 10a and 11a are located near one end of the switch housing 1, and the third and fourth fixed contacts 10b and 11b are located near the second end. In addition, a first pivot plate 12a is located on the bottom surface between the first and third fixed contacts 10a and 10b, and a second pivot plate 12b is located on the bottom surface between the second and fourth fixed contacts 11a and 11b. A first movable contact 8a is pivotably mounted in the case 1 on the first pivot plate 12a, and a second movable contact 8b is pivotably mounted on the second pivot plate 12b.

Operation of the first embodiment will now be described with reference to FIGS. 3(a) to 3(c).

Figure 3A:
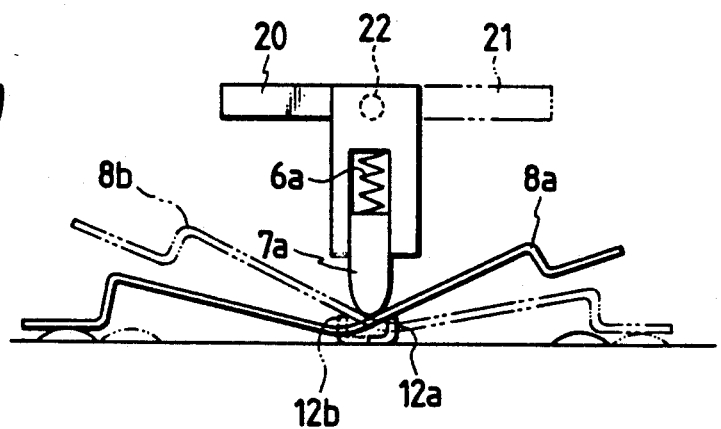
FIGS. 3(a), 3(b) and 3(c) are operational diagrams of the first embodiment of the invention.

As shown in FIG. 3(a), in a neutral state where the knobs 50, 51 are not actuated, the first moving contact piece 8a is biased by the first driving rod 7a against the third fixed contact 10b, and the second moving contact piece 8b is biased by the second driving rod 7b against the second fixed contact 11a.

Figure 3B:
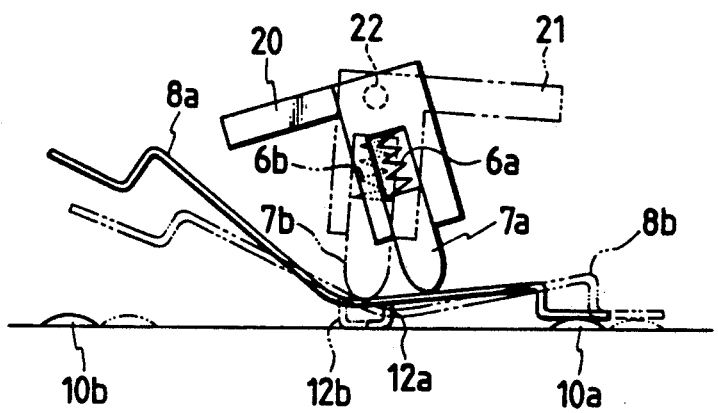

As shown in FIG. 3(b), when the first lever 20 is pushed downward from the neutral state by the knob 50 (not shown), the lever 20 pivots counterclockwise around the axle 22, and the first driving rod 7a slides along the movable contact 8a toward the first fixed contact 10a. Then, when the first driving rod 7a passes over the first pivot plate 12a, a clicking sensation is provided to the knob 50, and immediately thereafter the moving contact piece 8a pivots around the pivot plate 12a, and the movable contact 8a comes in contact with the first fixed contact 10a and is separated from the third fixed contact 10b. At the same time, since the knob 51 is not actuated, the lever 21 remains in the neutral position, and the second movable contact remains in contact with the second fixed contact 11a.

Figure 3C:
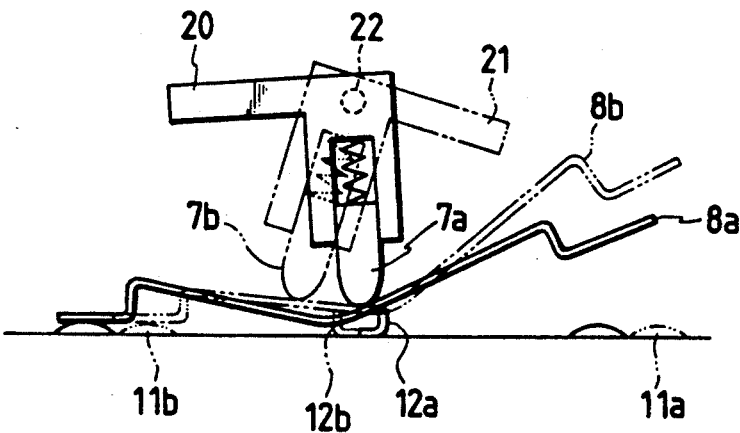

As shown in FIG. 3(c), when the second lever is pushed downward from the neutral state by the knob 51 (not shown), the lever 21 pivots clockwise around the axle 22, and the second driving rod 7b slides along the movable contact 8b toward the fourth fixed contact 11b. Then, when the second driving rod 7b passes over the second pivot plate 12b, a clicking sensation is provided to the knob 51, and immediately thereafter the moving contact piece 8b pivots around the pivot plate 12b, and the movable contact 8b comes in contact with the fourth fixed contact 11b and is separated from the second fixed contact 11a. At the same time, since the knob 50 is not actuated, the first lever 20 remains in the neutral position, and the first movable contact 8a remains in contact with the third fixed contact 10b.

As described above, according to the first embodiment, a switching operation can be effected by pressing on either of the knobs 50 and 51 without the other knob being lifted of the knobs 50 and 51 without the other knob being lifted up. Moreover, only one of the first and second levers 20 and 21 is depressed by pushing in the knobs 50, 51, therefore the other lever will not be raised, unlike the knob 3 of the prior art, thus reducing the amount of space occupied by the entire switch. Consequently, if the switch is used as a change-over switch for positioning automobile seats, then other parts may easily be arranged more efficiently around the switch to reduce the amount of occupied space. Further, the switch can be incorporated into a push-button type apparatus, similar to other switches arranged in a car, thereby providing a sense of congruity.

Additionally, the switch according to the first embodiment can be manufactured using the switch housing, fixed contacts, pivot plates and movable contacts of the prior art seesaw switch, and thus the manufacturing cost may sharply be decreased.

Figure 4A:
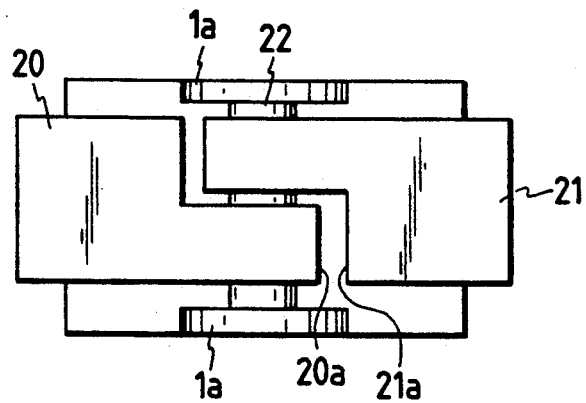
FIGS. 4(a) and 4(b) are explanatory drawings of a second embodiment of the invention.
Figure 4B:
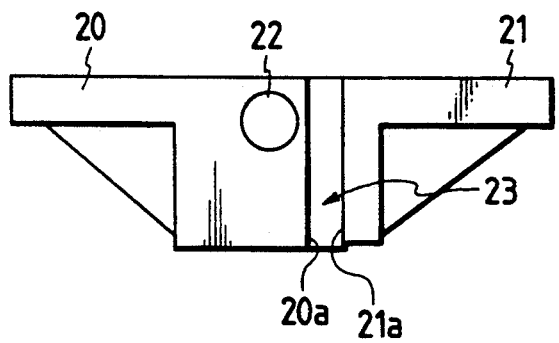
Figure 5:
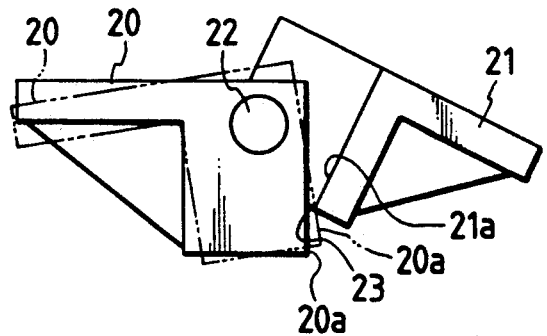
FIG. 5 is an operational diagram of the second embodiment of the invention.

FIGS. 4(a), 4(b) and 5 show a second embodiment of the present invention.

As shown in FIG. 4(a), in accordance with the second embodiment, the first and second levers 20 and 21 have an L-shape, when viewed from above, a first stopper portion 20a is provided on the lever 20, and a second stopper portion 21a is provided on the lever 21. These stopper portions 20a, 21a are opposite to each other and spaced by a clearance 23 when the first and second levers 20 and 21 are in the neutral position. The clearance 23 is set wide enough to allow an operation of one lever at a time by preventing the other lever from pivoting. Accordingly, the switch in accordance with the second embodiment prevents simultaneous actuation of both the first lever 20 and the second lever 21.

FIG. 5 shows the operation of the switch according to the second embodiment. FIG. 5 shows that when the second lever 21, for example, is pushed in from the neutral state, the lever 21 pivots clockwise around the axle 22. A switching operation similar to the foregoing first embodiment is carried out in the state of FIG. 5. When the switch is in the operating state of FIG. 5, the stopper portion 21a of the second lever 21 is positioned near to the stopper portion 20a of the first lever 20, thereby reducing the clearance 23 between the stopper portion 21a and the first lever 20. Accordingly, if the first lever 20 is pushed in when the second lever 21 pushed in, the stopper portion 21a of the first lever 20 abuts the stopper portion 21a of the second lever 21 (as indicated by the dotted line in FIG. 5), thereby preventing the first lever 20 from pivoting into an actuated position. Similarly, the second lever 21 cannot be pushed in when the lever 20 is in the actuated position. Further, in case the levers 20, 21 are pushed in both simultaneously from the state of FIG. 4 (b), both the first and second levers 20 and 21 are prevented from simultaneously entering an actuated position. The other construction and operation which are not particularly described in the second embodiment are same as in the case of the foregoing first embodiment.

As described above, according to the second embodiment, in addition to the working effect ensured by the foregoing first embodiment, a simple construction is available to prevent the lever 20 and the lever 21 from being pushed in simultaneously, thus a shutdown of the driving motor can be prevented, and an operating efficiency is enhanced.

Additionally, the description has referred to the clearance being left somewhat in the above second embodiment when the one lever is pushed in, however, this invention is not necessarily limited thereto, and hence a construction may be taken such that stopper portions of both the levers run against each other when, for example, one lever is pushed in.

Next a switch apparatus for adjusting automobile seat positions which employs the aforementioned switch will be described with reference to FIGS. 6 to 9.

Figure 6:
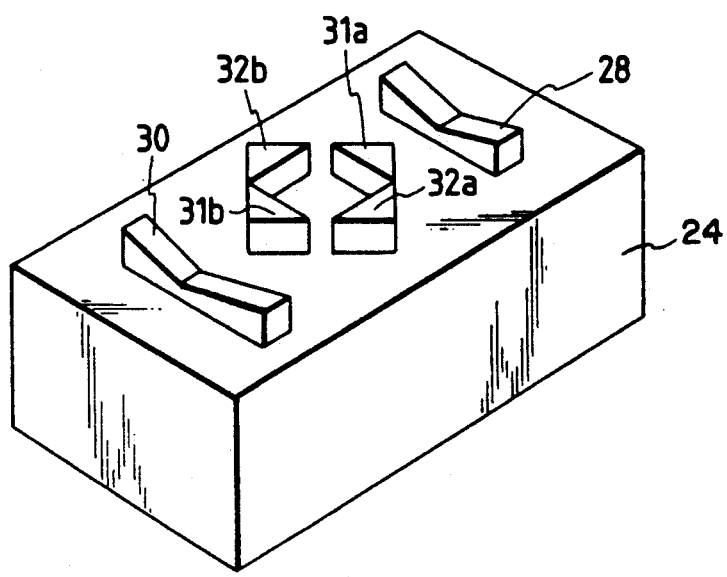
FIG. 6 is a perspective view of a switch apparatus for adjusting automobile seat positions according to a third embodiment of the invention.

As shown in FIG. 6, the switch apparatus includes a case 24, first and second pivoting knobs 28 and 30, and third through sixth slidable knobs 31a, 31b, 32a and 32b.

Figure 7:
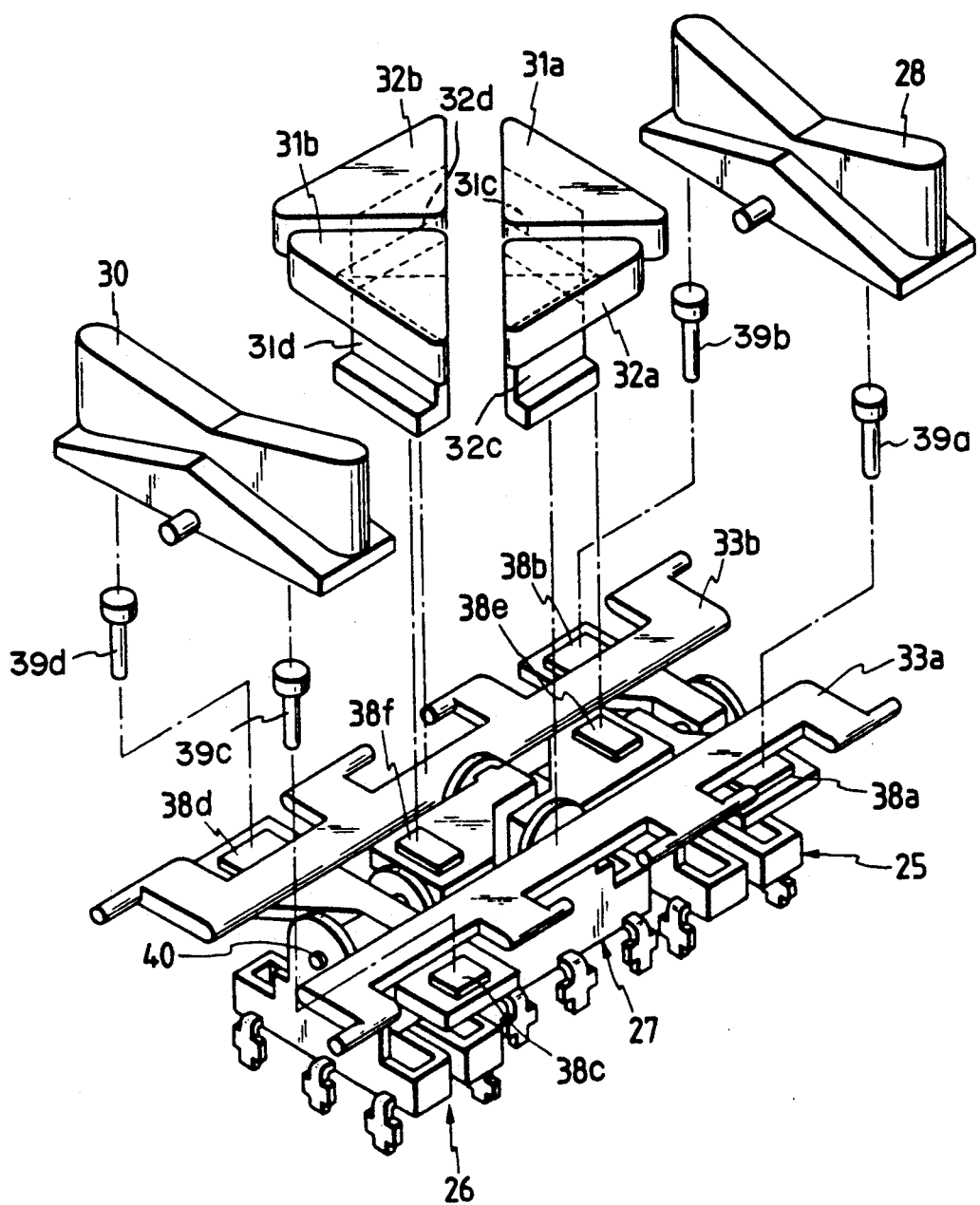
FIG. 7 is an exploded perspective view of a principal part of the switch apparatus for adjusting automobile seat positions according to the third embodiment of the invention.

As shown in FIG. 7, first, second and third seesaw switches 25, 26, 27 are mounted in the case 24 (not shown), each of the seesaw switches incorporating the structure according to either the first or second embodiments of the present invention, discussed above. The first, second and third seesaw switches 25, 26 and 27 are aligned in the case 24 such that the third switch 27 is positioned between the first switch 25 and the second switch 26. A first lever 38a and a second lever 38b are pivotably connected to the first switch 25 about a first axis, a third lever 38c and a fourth lever 38d are pivotably connected to the second switch 27 about a second axis which is parallel to the first axis, and a fifth lever 38e and a sixth lever 38f are pivotably connected to the second switch housing 36 about a third axis which is perpendicular to the first axis and the second axis. The first knob 28 is positioned over the first switch 25 and actuates the first lever 38a and the second lever 38b via pins 39a and 39b, respectively, when the first knob 28 is pivoted into a first operating position and a second operating position, respectively. The second knob 30 is positioned over the second switch 26 and actuates the third lever 38c and the fourth lever 38d via pins 39c and 39d, respectively, when the second knob 30 is pivoted into a third operating position and a fourth operating position, respectively. The third knob 31a includes a first depending portion 31c which actuates the fifth lever 38e when the third knob 31a is pressed into a fifth actuated position. The fourth knob 31b includes a second depending portion 31d which actuates the sixth lever 38f when the fourth knob 31a is pressed into a sixth actuated position. In addition, a first elongated member 33a is pivotably mounted to the case 24 over the first lever 38a and the third lever 38c, and a second elongated member 33b is pivotably mounted to the case 24 over the second lever 38b and the fourth lever 38d. The fifth knob 32a includes a third depending portion 32c which presses against the first elongated member 38a when the fifth knob 32a is in a seventh operating position, thereby causing the first elongated member to simultaneously bias the first lever 38a into the first actuated position and third lever 38c into the third actuated position. Likewise, the sixth knob 32b includes a fourth depending portion 32d which presses against the second elongated member 38b when the sixth knob 32b is in an eighth operating position, thereby causing the second elongated member to simultaneously bias the second lever 38b into the second actuated position and fourth lever 38d into the fourth actuated position.

Figure 8:
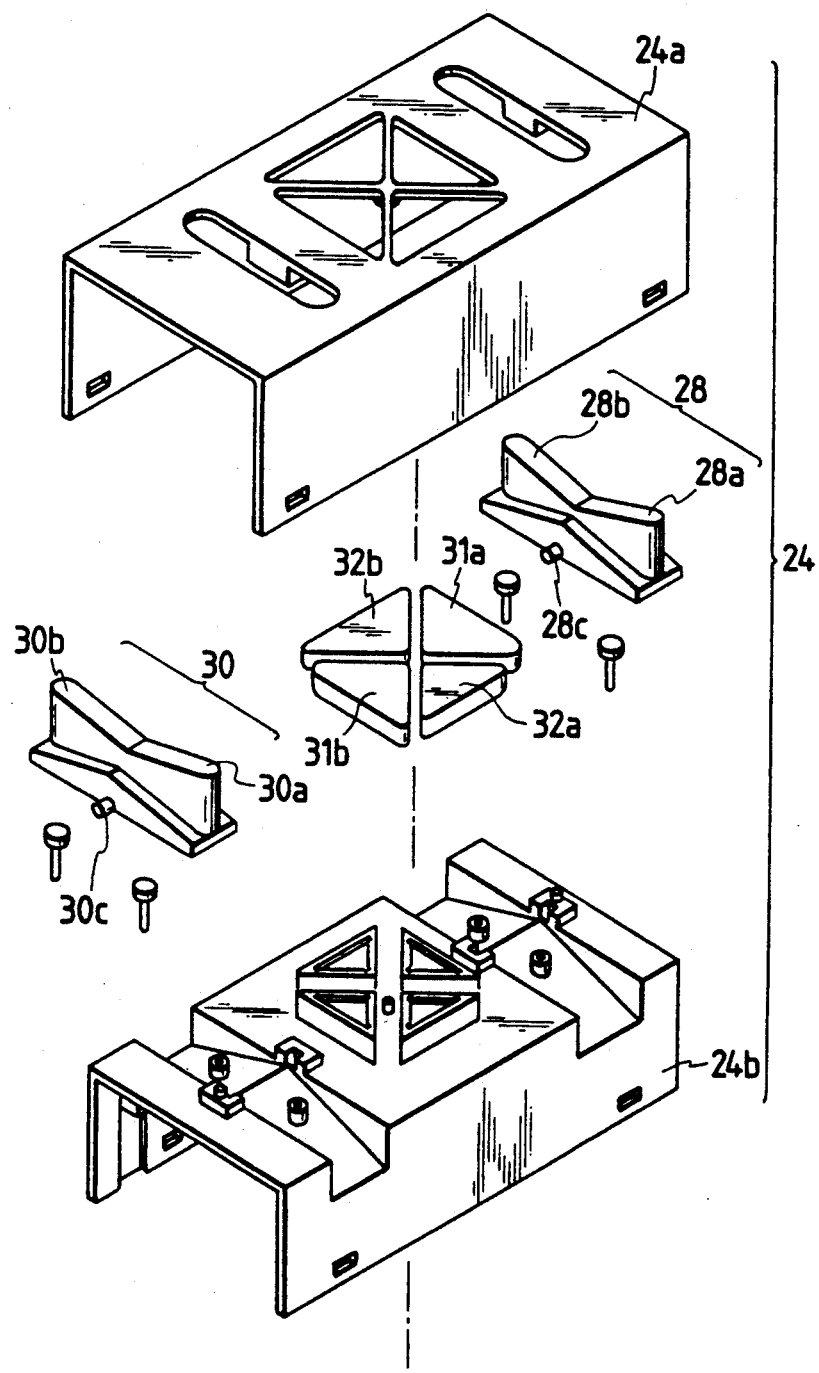
FIG. 8 is an exploded perspective view of the switch apparatus for adjusting automobile seat positions according to the invention.
Figure 9:
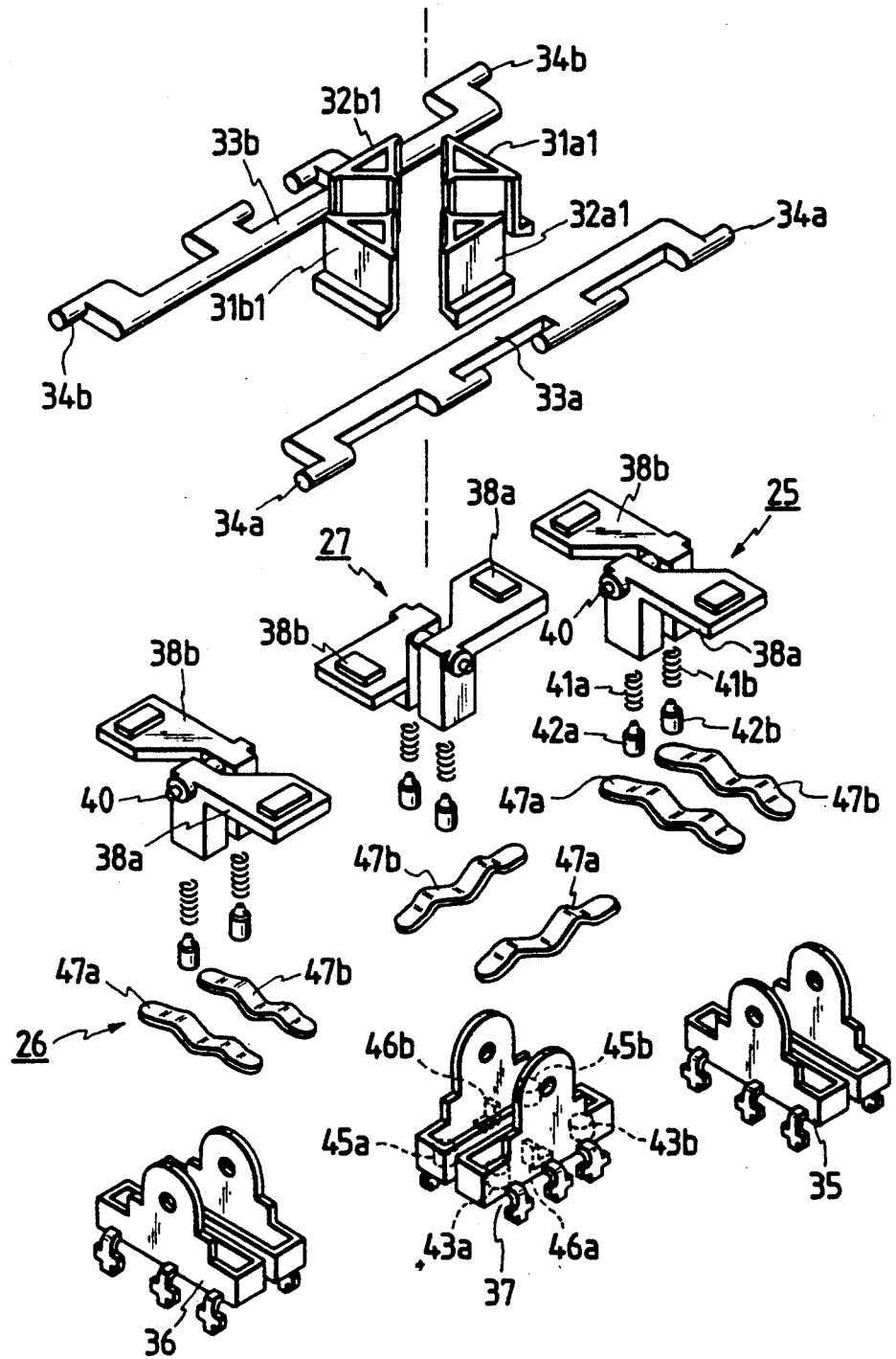
FIG. 9 is an exploded perspective view of the switch apparatus for adjusting automobile seat positions according to the invention.
Figure 10:
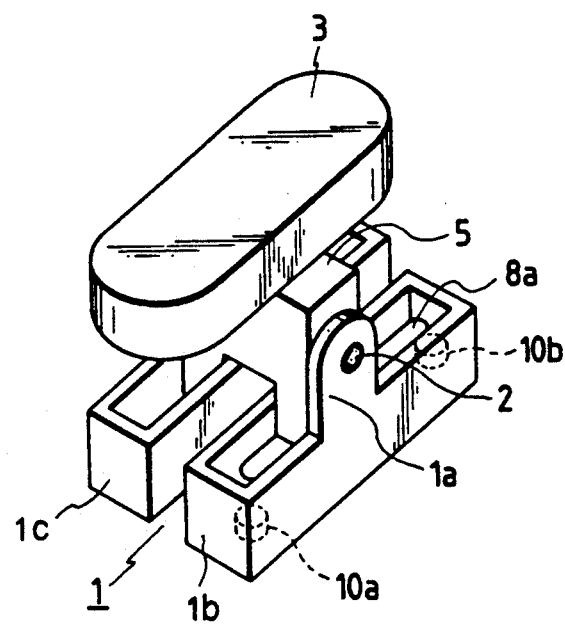
FIG. 10 is a perspective view of a prior art seesaw switch.
Figure 12A:
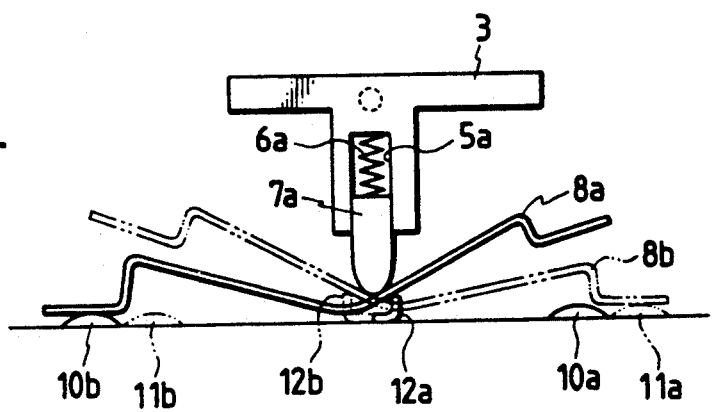
FIGS. 12(a) and 12(b) are operational diagrams of the prior art switch.
Figure 12B:
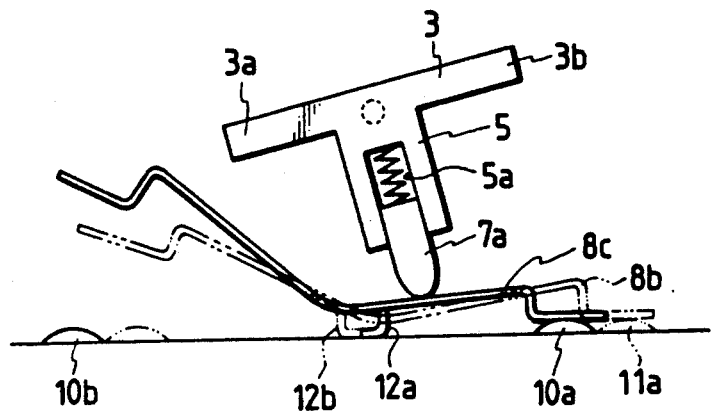
Figure 11:
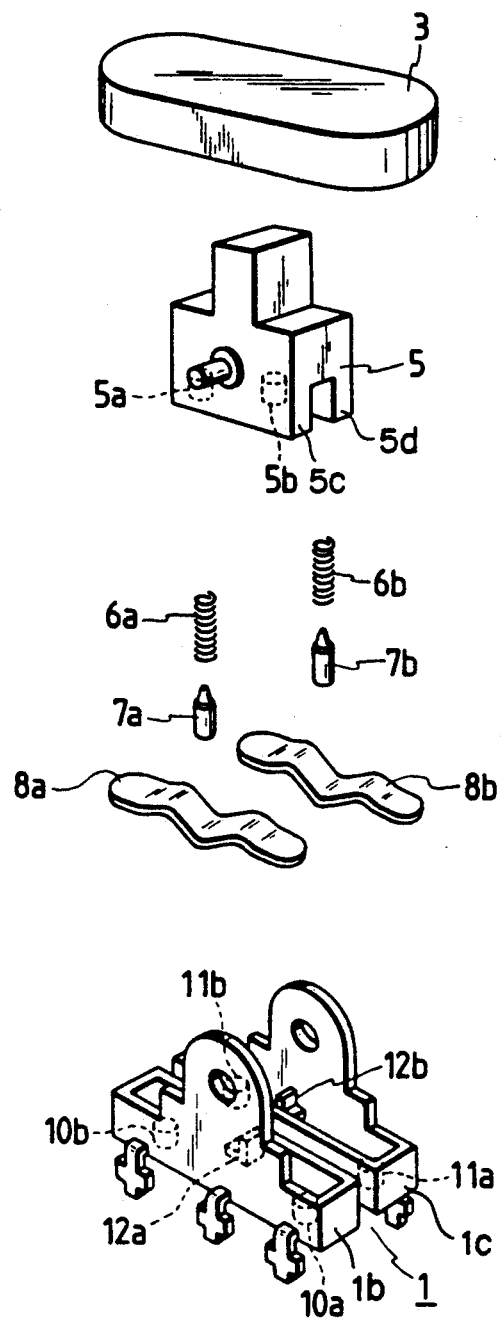
FIG. 11 is an exploded perspective view of the prior art switch.
Figure 13:
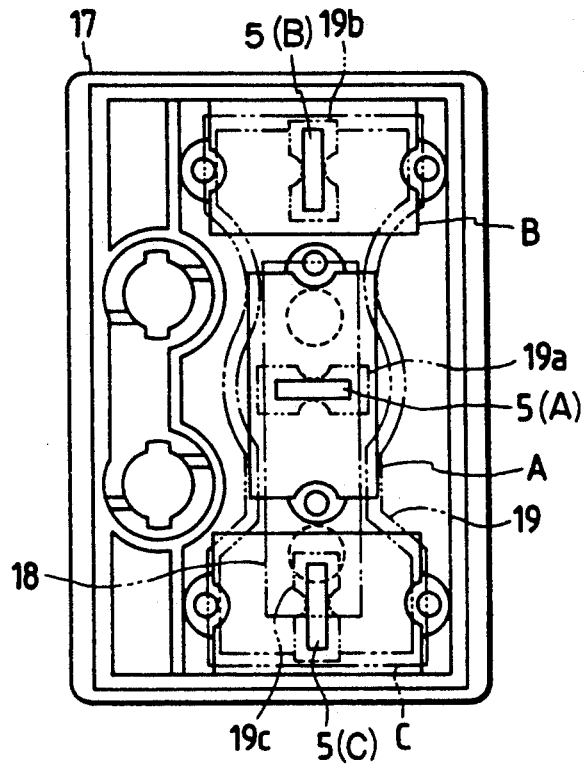
FIG. 13 is a plan view of a prior art switch apparatus for adjusting automobile seat positions.
Figure 14:
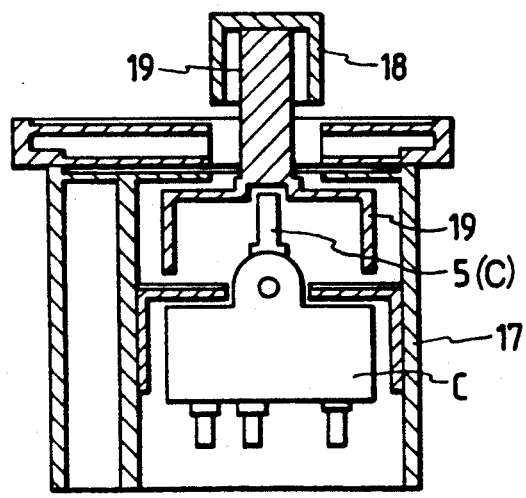
FIG. 14 is a transverse sectional view of FIG. 13.
Figure 15:
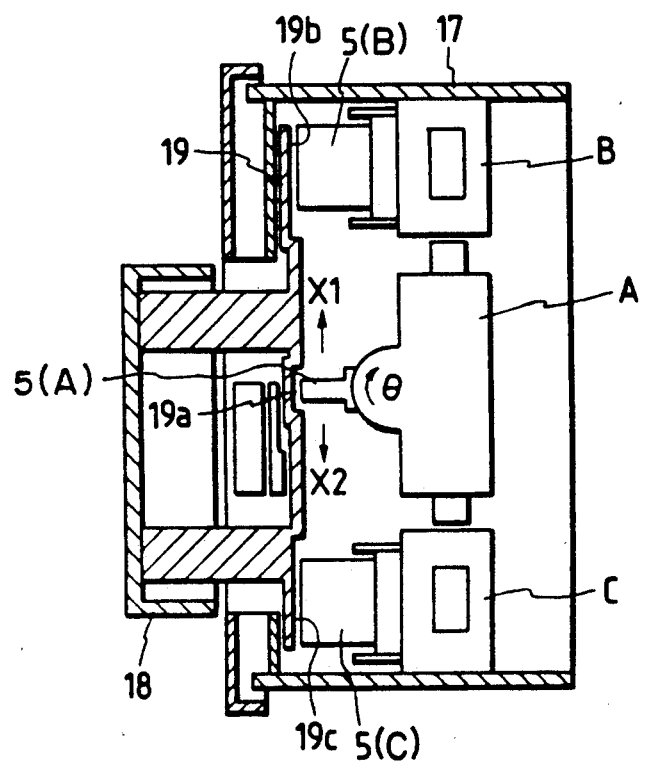
FIG. 15 is a longitudinal sectional view of FIG. 13.

As shown in FIGS. 8 and 9, the case 24 consists of an upper case 24a and a lower case 24b. Referring to FIG. 9, since the switches 25, 26, 27 are of a single construction, only the switch 25 will described. The seesaw switch 25 has a switch housing 25 into which are formed fixed contacts (not shown). The lever 38a and the lever 38b are separately mounted, each being rotatable around an axle 40. Further, end portions 28a, 28b (FIG. 8) of the knob 28 are mounted depressibly of the levers 38a, 38b respectively around a axle 28c close to end portions of the levers 38a, 38b. In addition, as shown in FIG. 7, a push rod 42a is enclosed retractably in the lever 38a through a spring 41a, and likewise a push rod 42b is enclosed retractably in the lever 38b through a spring 41b. Further, fixed contacts 43a, 43b and fixed contacts 45a, 45b are provided on an inner bottom surface of the switch housing 35 of the switch 25, and movable contacts 47a, 47b are pivotably arranged on support plates 46a, 46b provided projectingly on the inner bottom surface respectively.

The switch 26 is also of the same structure as the switch 25 mentioned above, a switch section on one side portion and a switch section on another side portion being switched by actuation of end portions 30a, 30b of the knob 30, and is disposed in the case 24 on the opposite side of the switch 25. A reference character 30c represents an axle. Further, the switch 27 has the same structure as these switches is mounted on the case 24 between the switch 25 and the switch 26, and the switch 27 is arranged such that a switch section on one side portion and a switch section on another side portion are ready for switching operation through actuating members 31a1, 31b1 by depressing push-buttons (knobs) 31a, 31b.

As illustrated in FIG. 4 to FIG. 7, push-buttons (knobs) 32a, 32b are provided adjacently to the push-buttons 31a, 31b of the upper case 24a, and an elongated (interlocking) member 33a engagable with the lever 38a of the switch 25 and a lever 38c of the switch 26 on opposite end portions and driven by an operation of the knob 32a is provided in the lower case 24b. Similarly, an elongated (interlocking) member 33b engagable with the lever 38b of the switch 25 and a lever 38d of the switch 26 on opposite end portions and driven by an operation of the knob 32b is provided in the lower case 24b. Reference characters 34a, 34b represent axles of the interlocking members 33a, 33b respectively.

Described next is an operation by an actuation of the push-buttons 32a, 32b. When the push-button 32a is depressed, the interlocking member 33a is driven through the actuating member 32a1, opposite ends of the interlocking member 33a come in contact and thus engage with the lever 38a of the switch 25 and the lever 53a of the switch 26 respectively, the levers 38a, 53a are turned and a switching operation of the switch sections on one side portions of the switch 25 and the switch 26 is carried out simultaneously. Meanwhile, when the push-button 32b is actuated, the interlocking member 33b is driven through the actuating member 32b1, opposite ends of the interlocking member 33b come in contact and thus engage with the lever 38b of the switch 25 and the lever 53b of the switch 26 respectively, the levers 38b, 53b are turned and a switching operation of the switch sections on other side portions of the switch 25 and the switch 26 is carried out simultaneously.

Thus according to the aforementioned embodiment, the switch section on the one side portion and the switch section on the other side portion can be actuated for switching operation independently by actuating the operating buttons 28, 30 and the push-buttons 31a, 31b corresponding each to the three switches 25 to 27 disposed within the case 24. Further, from operating the push-buttons 32a, 32b, the switches 25 and 26 can be actuated for switching operation. Consequently, the switch can be used for a variety of purposes, and thus the system of various manipulations such as adjustment of the front of the seat up and down, the rear of the seat up and down, the overall seat up and down and so forth may be realized simply by one switch apparatus.

Further, the switch apparatus can be manufactured simply at a low cost from utilizing a principal part of the prior art swinging switch exactly as it is, another end will never be raised from pushing in one end of the lever as in the case of prior art swinging switch, and an entire occupied space of the switch apparatus can be reduced. Consequently, when it is used as a change-over switch for driving automobile seats, other parts can easily be configured peripherally for the reduction of occupied space. Further, the seat driving operation switch can be manipulated by pushing in a push-button similarly to other switches arranged in the car, and thus a sense of congruity may be maintained. Still further, the lever size is half of the prior art lever, therefore the lever can be made lightweight, thus reducing a force of operation at the time of switch actuation.

The description has referred to a construction wherein two switches can be transferred in an interlocking manner in the aforementioned embodiment, however, this invention is not necessarily limited to the particular embodiment, and hence it is conceivable that the construction will interlock, for example, with three switches.

As described above, according to this invention, an independent switching operation of each switch and a simultaneous switching operation of at least two switches selected beforehand can be effected selectively. Additionally, a stroke of the push-button is limited structurally and an occupied space of the switch apparatus can be reduced. Further, a push-button switch apparatus working on large current can be manufactured simply at low cost from using a principle part of the prior art swinging switch apparatus exactly as it is, thus the lever can be made half in construction as compared with a conventional one, and a force of switching operation can be reduced.

We claim:

1. A switch apparatus comprising:
   a switch housing including a bottom surface;
   first and second fixed contacts disposed on the bottom surface adjacent a first end of the switch housing;
   third and fourth fixed contacts disposed on the bottom surface adjacent a second end of the switch housing;
   a first pivot plate disposed on the bottom surface between the first and third fixed contacts;
   a second pivot plate disposed on the bottom surface between the second and fourth fixed contacts;
   a first movable contact pivotably disposed in the switch housing having a first end disposed adjacent the first fixed contact, a second end disposed adjacent the third fixed contact, and a first middle portion abutting the first pivot plate;
   a second movable contact pivotably disposed in the switch housing having a third end disposed adjacent the second fixed contact, a fourth end disposed adjacent the fourth fixed contact, and a second middle portion abutting the second pivot plate;
   a first lever pivotably connected to the switch housing about an axis, the first lever including a first driving portion contacting the first middle portion of the first movable contact; and
   a second lever pivotably connected to the switch housing about the axis, the second lever including a second driving portion contacting the second middle portion of the second movable contact;
   wherein:
   when the first and second levers are in neutral positions, the first lever biases the first movable contact against the first fixed contact and the second lever biases the second movable contact against the fourth fixed contact;
   when the first lever is in a first pivoted position, the first lever biases the first movable contact against the third fixed contact and the second lever remains in the neutral position; and
   when the second lever is in a second pivoted position, the second lever biases the second movable contact against the second fixed contact and the first lever remains in the neutral position.

2. A switch apparatus of claim 1 wherein the first lever includes a first stopper portion positioned such that when the first lever is in the first pivoted position, the first stopper portion prevents the second lever from pivoting into the second pivoted position, and the second lever includes a second stopper portion positioned such that when the second lever is in the second pivoted position, the second stopper portion prevents the first lever from pivoting into the first pivoted position.

3. A multiple switch apparatus comprising:
   a case;
   a first switch housing located in the case;
   a second switch housing located in the case;
   a third switch housing located in the case between the first switch housing and the second switch housing;
   first and second levers pivotably connected to the first switch housing about a first axis;
   third and fourth levers pivotably connected to the second switch housing about a second axis, the second axis being parallel to the first axis;
   fifth and sixth levers pivotably connected to the third switch housing about a third axis, and third axis being perpendicular to the first axis and the second axis;
   a first knob pivotably connected to the case over the first switch housing, the first knob being operably connected to the first and second levers such that when the first knob is pivoted into a first operating position, the first lever is pivoted into a first actuated position, and when the first knob is pivoted into a second operating position, the second lever is pivoted into a second actuated position;
   a second knob pivotably connected to the case over the second switch housing, the second knob being operably connected to the third and fourth levers such that when the second knob is pivoted into a third operating position, the third lever is pivoted into a third actuated position, and when the second knob is pivoted into a fourth operating position, the fourth lever is pivoted into a fourth actuated position;
   a third knob slidably connected to the case over the third switch housing and having a first depending portion positioned relative to the fifth lever such that when the third knob is pressed into a fifth operating position, the fifth lever is pivoted into a fifth actuated position;
   a fourth knob slidably connected to the case over the third switch housing and having a second depending portion positioned relative to the sixth lever such that when the fourth knob is pressed into a sixth operating position, the sixth lever is pivoted into a sixth actuated position;
   a first elongated member pivotably connected to the case and extending first lever and the third lever;
   a fifth knob slidably connected to the case over third switch housing and having a third depending portion positioned relative to the first elongated member such that when the fifth knob is pressed into a seventh operating position, the first elongated member biases both the first lever into the first actuated position, and the third lever into the third actuated position;

a second elongated member pivotably connected to the case and having portions positioned adjacent the second lever and the fourth lever; and a sixth knob slidably connected to the case over third switch housing and having a fourth depending portion positioned relative to the second elongated member such that when the sixth knob is pressed into a eighth operating position, the second elongated member biases both the second lever into the second actuated position, and the fourth lever into the fourth actuated position.

* * * * *